(12) United States Patent
Xiao et al.

(10) Patent No.: US 9,573,194 B2
(45) Date of Patent: Feb. 21, 2017

(54) MAKING NANOCRYSTALLINE MESOPOROUS SPHERICAL PARTICLES

(71) Applicants: GM GLOBAL TECHNOLOGY OPERATIONS LLC, Detroit, MI (US); THE REGENTS OF THE UNIVERSITY OF CALIFORNIA, Oakland, CA (US)

(72) Inventors: Qiangfeng Xiao, Troy, MI (US); Mei Cai, Bloomfield Hills, MI (US); Hiesang Sohn, Los Angeles, CA (US); Yunfeng Lu, Los Angeles, CA (US)

(73) Assignees: GM Global Technology Operations LLC, Detroit, MI (US); The Regents of the University of California, Oakland, CA (US)

(*) Notice: Subject to any disclaimer, the term of this patent is extended or adjusted under 35 U.S.C. 154(b) by 75 days.

(21) Appl. No.: 14/466,093

(22) Filed: Aug. 22, 2014

(65) Prior Publication Data
US 2015/0021801 A1    Jan. 22, 2015

Related U.S. Application Data

(60) Division of application No. 13/226,733, filed on Sep. 7, 2011, now Pat. No. 8,840,816, which is a continuation-in-part of application No. 12/828,353, filed on Jul. 1, 2010, now Pat. No. 8,728,361.

(51) Int. Cl.
| | |
|---|---|
| B22F 9/30 | (2006.01) |
| B22F 1/00 | (2006.01) |
| C22C 1/10 | (2006.01) |
| B29B 9/00 | (2006.01) |

(52) U.S. Cl.
CPC ............... *B22F 9/30* (2013.01); *B22F 1/0048* (2013.01); *B29B 9/00* (2013.01); *C22C 1/1026* (2013.01); *B22F 2302/10* (2013.01); *B22F 2302/25* (2013.01); *B22F 2304/00* (2013.01); *B22F 2998/10* (2013.01)

(58) Field of Classification Search
CPC ....................................................... B22F 9/30
See application file for complete search history.

(56) References Cited

U.S. PATENT DOCUMENTS

2006/0083694 A1    4/2006  Kodas et al.

OTHER PUBLICATIONS

Yungfeng Lu; Aerosol-assisted self-assembly of mesostructured spherical nanoparticles; Nature; vol. 398; Mar. 18, 1999; 1999 Macmillan Magazines Ltd.; pp. 223-226.

*Primary Examiner* — Larry Thrower
(74) *Attorney, Agent, or Firm* — Reising Ethington P.C.

(57) ABSTRACT

Spherical particles of one or more elemental metals and elemental carbon are prepared from a precursor in the form of a metal oleate. The metal oleate precursor is dispersed in a liquid vehicle and aerosol droplets of the dispersed precursor are formed in a stream of an inert gas. The aerosol droplets are heated in the stream to decompose the oleate ligand portion of the precursor and form spherical particles that have a mesoporous nanocrystalline structure. The open mesopores of the spherical particles provide a high surface area for contact with fluids in many applications. For example, the mesopores can be infiltrated with a hydrogen absorbing material, such as magnesium hydride, in order to increase the hydrogen storage capacity of the particles.

12 Claims, 3 Drawing Sheets

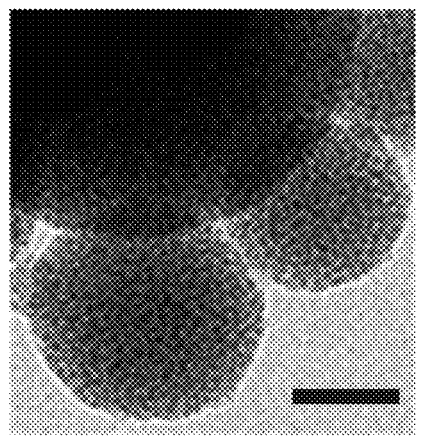
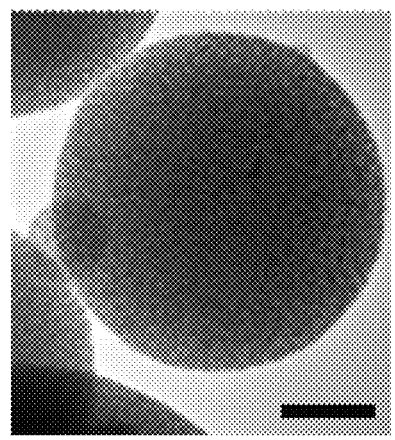
*FIG. 2A*  *FIG. 2B*
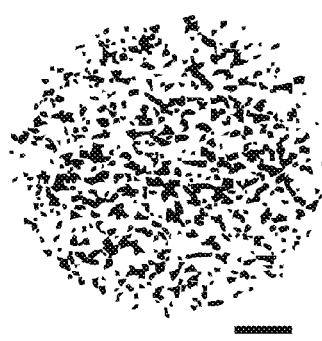
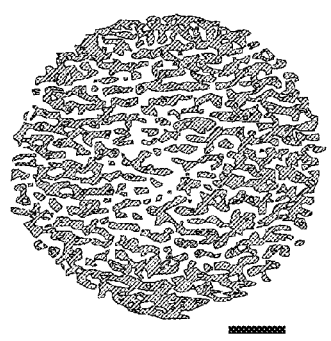
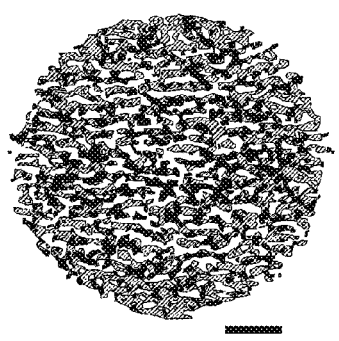
*FIG. 3A*  *FIG. 3B*  *FIG. 3C*

MAKING NANOCRYSTALLINE MESOPOROUS SPHERICAL PARTICLES

This application is a division of U.S. patent application Ser. No. 13/226,733, titled "Making Nanocrystalline Mesoporous Spherical Particles", filed Sep. 7, 2011 which is a Continuation-in-Part of U.S. patent application Ser. No. 12/828,353, titled "Making Nanostructured Porous Hollow Spheres with Tunable Structure," filed on Jul. 1, 2010, now U.S. Pat. No. 8,728,361. Both the co-pending parent application and issued patent are assigned to the assignees of this invention. The contents of both applications are incorporated herein by reference.

TECHNICAL FIELD

This invention pertains to methods of making spherical particles that are a composite of one or more elemental metals and elemental carbon. The spherical particles are characterized by a mesoporous nanocrystalline structure consisting of three-dimensional networks of metal nanocrystals. An aerosol-assisted process is employed using solutions comprising metal oleate coordination complexes.

BACKGROUND OF THE INVENTION

The above identified U.S. Pat. No. 8,728,361 discloses methods of making hollow spherical particles that are a composite of one or more elemental metals and elemental carbon. To make the hollow spherical particles, a dispersion of a precursor material in a liquid vehicle is formed and comprises at least one of (i) ions of the one or more metal elements and an organic ligand and (ii) a metal-organic ligand compound of each of the one or more metal elements. An aerosol of the liquid-dispersed precursor material is formed in a stream of inert gas, which is then heated to remove the liquid, decompose organic acid material and form porous, hollow spherical particles of a composite of the one or more metals and carbon.

FIGS. 3A-3C, 4A-4B, 5 and 6A-6B of the prior application (Ser. No. 12/828,353) are TEM images and depict hollow metal-carbon composite spheres that were formed from the as-disclosed aerosol-forming and thermal degradation process. As shown in these figures, the morphology of the particles is characterized by a densely porous metal-carbon exterior shell in the shape of a sphere that has a less-dense porous interior, such that the particles are characterized as "hollow." The particles are characterized as hollow because of the less-dense porous interior within the highly dense spherical shell. The hollow spherical particles are typically smaller than one micron in diameter and have nanometer-sized pores in their interior.

As discussed in our co-pending application, very small porous particles have use in a wide variety of applications, such as, optical, electronic, magnetic, catalytic, and sensing devices ranging from photonic crystals to drug-delivery carriers. In certain applications, these porous spherical particles may be more advantageous than their bulk materials because their porous structure, which results in lower density, higher surface area, extra interior reaction space, and a reduced amount of material.

SUMMARY OF THE INVENTION

Now, it is found that spherical metal-carbon or metal alloy-carbon composite particles having a similar but different morphological character can be formed from some of the same precursor materials and a similar aerosol-forming and thermal degradation process. As before, composite particles of one or more elemental metals and elemental carbon are made from a precursor in the form of a coordination complex. But, in this instance, the resulting structure of the particles is different. The particles of the present application have a generally uniform, mesoporous cross-section that does not have a densely porous exterior shell, unlike the particles disclosed in our co-pending application.

The spherical particles of the present application also have use in a wide variety of applications due to their porosity and high surface area, for example in catalysis. Further, it is now found that the meso-porosity of these spherical particles allows for the effective absorption and release of hydrogen. In addition, the open mesopores enable the particles to be infiltrated with additional hydrogen absorbing materials, such as magnesium hydride.

As discussed in our U.S. Pat. No. 8,728,361, the morphology of the ultimate spherical particles can vary depending on the materials used to prepare the metal-organic ligand precursors. Specifically, it is found that the morphology of the spherical particles varies depending on the thermal degradation behavior of the metal-organic ligand precursors, which is a function of the reactivity between metal compound and the organic ligand as well as the thermal degradation behavior of the organic ligand. The stronger the bond between the metal and the organic ligand, the more likely it is that spherical particles will form with a hollow structure. When organic ligands with low thermal degradation temperatures are used, the chances of forming hollow spherical particles increases.

The degree of ionization of the prepared metal oleate precursors can also be controlled in order to direct the morphology of the spherical particles. Precursors with a high ionization degree, or a high number of unbound inorganic ions, will result in the formation of hollow spherical particles, such as the particles disclosed in our U.S. Pat. No. 8,728,361. On the other hand, precursors prepared according to embodiments of the present invention have a relatively low ionization degree, and lead to the formation of spherical particles that do not have a densely porous exterior shell.

According to embodiments of the present invention, a precursor in the form of one or more metal oleates is prepared by reacting one or more metal oxides, metal acetates, or metal acetylacetonates with oleic acid and heating the mixture to evaporate water, acetic acid or acetylacetone. The precursor may alternatively be formed by complexing metal salts, such as metal chlorides or metal nitrates, with oleic acid in a basic solution, precipitating the precursor from the solution, and then separating the precursor from any by-products.

As before, the prepared precursor is then dispersed in a suitable solvent having a molar concentration of about 0.01 to about 0.5 mole of metal oleate per liter of dispersant. And metal-carbon composite particles are formed from the prepared precursor dispersion using an aerosol-forming and thermal degradation process. But, unlike our U.S. Pat. No. 8,728,361, use of a metal oleate precursor prepared according to embodiments of the present application results in the formation of spherical particles that have a generally uniform cross-section and a mesoporous nanocrystalline structure.

In practice, aerosol droplets of the liquid-dispersed metal oleate precursor are carried through a heated tubular reactor in a stream of an inert gas. In preferred embodiments, the tubular reactor is heated to about 550° C. and is operated at a volumetric flow rate of about 2.6 L/min (STP). This configuration provides a suitable residence time for the aerosol droplets in the reactor and allows for the relatively slow evolution of the mesoporous nanocrystalline structure of the spherical particles. A suitable temperature and residence time of the aerosol droplets in the reactor will allow the organic ligands to decompose and three-dimensional (3-D) networks of metal nanocrystals to form within the spherical particles, without contributing to the nucleation of metal ions or atoms on the surface of the aerosol droplets.

Without intending to be limited by a proposed understanding of particle formation, it is believed that the nanocrystalline structure of the spherical particles is a result of a sequence of steps that occur when the aerosol droplets are heated. It is believed that the sequence consists of the: (1) formation of metal nanocrystals that are stabilized by the oleate ligands which act as surface-capping agents at high temperature, (2) formation of clusters of the metal nanocrystals, (3) fusion of the metal nanocrystals, and (4) formation of 3-D networks of metal nanocrystals within the aerosol droplets. The metal nanocrystals are uniformly attached by fine elemental carbon particles. The carbon particles exist as a residue from the decomposed organic ligands.

The spherical particles of the present invention are typically less than one micron in diameter. The metal nanocrystals within the particles range in size from about 3 to 4 nanometers. The open passages between the metal nanocrystals elemental metal form, opposed to metal oxide form. The low oxygen content and of the 3-D networks define mesopores, and have an average diameter centered at about 3 to 4 nanometers. The nano crystalline mesoporous structure of the spherical particles results in a high surface-area of about 200 to about 250 $m^2/g$.

The composition of the as-synthesized spherical particles consists of, by weight, about 80% one or more elemental metals, 18% elemental carbon, and 2% oxygen. Although the particles contain some oxygen, the particles are in the reducing atmosphere produced in the tubular reactor enables the formation of the elemental metal particles.

In further embodiments, the hydrogen storage capacity of the spherical particles can be increased by infiltrating the open mesopores of the as-synthesized particles with particles of a suitable hydrogen storage material. For example, magnesium hydride ($MgH_2$) compounds, which are known for their reversible hydrogen storage abilities, can be formed in the mesopores of the as-synthesized spherical particles. Mesoporous $MgH_2$-containing particles are prepared by immersing the as-synthesized particles in a dibutylmagnesium ($Mg(Bu)_2$) solution to form particles containing $Mg(Bu)_2$ compounds. The $Mg(Bu)_2$ precursor compounds are then converted to $MgH_2$ by heating the $Mg(Bu)_2$-containing particles to about 200° C. under a hydrogen pressure of about 50 bar.

Spherical metal-carbon composite particles produced by this process may be observed and characterized using electron microscopy, x-ray diffraction, spectroscopic analysis, electron tomography, nitrogen absorption data, hydrogen adsorption data and the like.

Other objects and advantages of this invention will be apparent from a further description of preferred (but not-limiting) embodiments of the invention. The described practices are chosen to illustrate certain embodiments of this invention, and are not limitations on the scope of this invention.

BRIEF DESCRIPTION OF THE DRAWINGS

FIGS. 2A-2B are transmission electron microscope (TEM) images of mesoporous spherical particles formed according to embodiments of the present invention, which reveal the nanocrystalline network structure of the particles. FIG. 2A shows spherical particles of nickel, and FIG. 2B shows spherical particles of an alloy of nickel and platinum. The scale-bars in the respective figures represent fifty nanometers in length.

FIGS. 3A-3C are slices of a three-dimensional image (tomogram) of a single spherical nickel particle that was produced using electron tomography (ET) and a transmission electron microscope (TEM) operated at 200 kV. To obtain the tomogram, several particles were deposited onto a grid and were tilted and imaged in a range from −70° to +70°. The tilt series was aligned and used to reconstruct a three-dimensional representation of each particle. The reconstructions were further segmented to illustrate the relationship between nickel and carbon, and the pores within the particles. FIGS. 3A-3C depict an array of images of slices through the 3-D tomogram that have different thicknesses and show the density variation between the Ni framework and the surrounding carbon layer, as well as the 3-D nanocrystalline structure of the particles. FIG. 3A depicts the density of the carbon particles and FIG. 3B depicts the density of the nickel particles throughout the mesoporous nanocrystalline spherical particles. FIG. 3C shows the density variation of between the carbon and nickel particles throughout the spherical particles formed according to embodiments of the present invention. The scale-bar represents twenty nanometers in length.

FIGS. 4A-4E are images of aerosol droplets that were taken at about $\tau$ equal to 0.6, 1.2, 1.8, 2.4 and 9.0 seconds, respectively, in the tubular reactor, and show the structural evolution of the spherical particles. The scale-bars in the respective figures represent fifty nanometers in length.

DESCRIPTION OF PREFERRED EMBODIMENTS

It is found that very small spherical metal-carbon or metal alloy-carbon particles having a nanocrystalline structure can be formed using an aerosol process. The spherical particles are typically less than one micron in diameter and have an internal structure that primarily consists of 3-D networks of nanocrystals, such that the particles are characterized as mesoporous.

In general, one or more elemental metals are identified for preparation in order to form the mesoporous spherical particles. The prepared metal compounds are then combined with oleic acid to form a dissolved metal oleate coordination complex. The coordination complex may be formed or placed in a liquid medium, such as a solvent of tetrahydrofuran (THF). In the following paragraphs of the specification, metal-carbon and metal alloy-carbon particle forming methods involving the use of nickel or platinum or mixtures of nickel and platinum will be presented as non-limiting illustrations of the invention. Spherical particles of nickel and platinum are candidates for catalyst applications in many different products, and in other applications for small conductive particles with large surface areas. But practices of the invention are applicable to metals generally and not limited to nickel and platinum.

Figure 1:
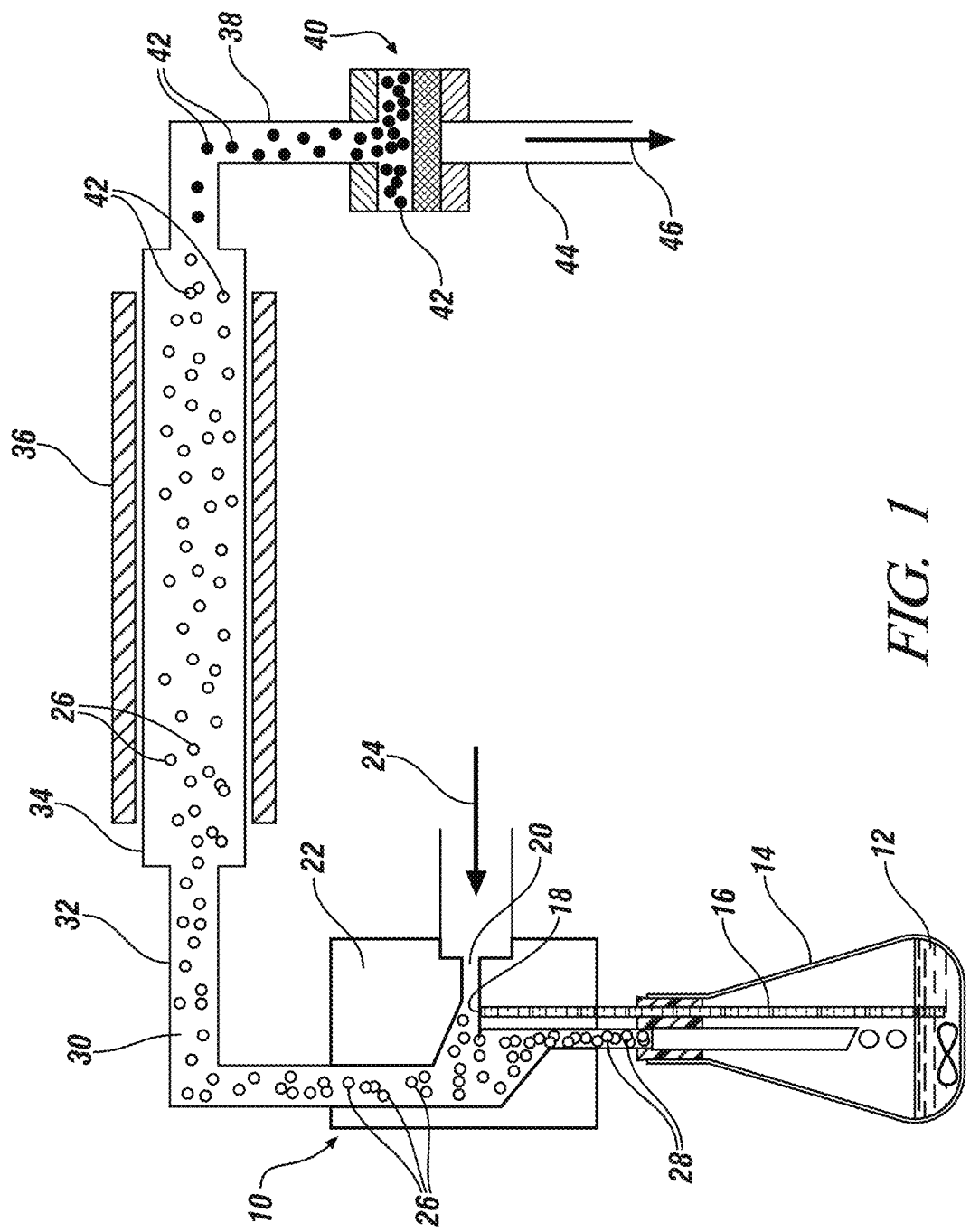
FIG. 1 is a schematic illustration of an apparatus for forming an aerosol in an inert gas stream from a liquid-dispersed metal oleate precursor in an illustrative practice of this invention. The aerosol is carried through a tubular reactor maintained at an elevated temperature to decompose the organic ligands and solvent molecules, leaving mesoporous spherical particles having a nanocrystalline structure. The particles are then filtered from the stream, collected and post-heated.

FIG. 1 is a schematic drawing, partly in cross-section, illustrating the use of a commercial laboratory size atomizer 10 (Model 3076, TSI, Inc. St. Paul, Minn.) operated with nitrogen as a carrier/atomization gas. This atomizer produces aerosol droplets with a size distribution characterized by a geometric standard deviation of 2 (95% of the liquid particles have diameters between 0.25 and 4 times the mean diameter).

A precursor solution 12 of one or more metal oleates (as described above in this specification) is placed in a suitable container or reservoir 14. A vertically-oriented draw tube 16 provides a passage for a stream of the precursor solution 12 from its reservoir 14 to pinhole 18, an opening into atomization gas inlet 20 in the atomizer body 22. A stream of nitrogen gas (or other suitable atomization gas), indicated by directional arrow 24 is introduced into atomization gas inlet 20, reducing the pressure at pinhole 18. In an illustrative operation of atomizer 10, nitrogen gas under an initial pressure of 40 psig was introduced under laminar flow condition through inlet 20 into the atomizer body 22 at a flow rate of 2.6 L (STP)/min. This nitrogen gas flow produced a pressure drop at pin hole 18, permitting the atmospheric pressure acting on the solution 12 to push a stream of the precursor solution up through the draw tube 16 to pinhole 18. The precursor solution entering the atomization stream 24 is converted to very small aerosol droplets 26 (schematically enlarged in FIG. 1). As stated above, the aerosol droplets vary in size. Some of the larger droplets 28 fall back into the precursor solution 12. But, many of the aerosol droplets 26 are carried in the flow of atomization gas 24. This combined stream of nitrogen gas and aerosol droplets 26 leaves the atomizer body 22 via a tubular passage 32 and is now indicated as a combined stream 30 in FIG. 1. The continually-flowing combined stream 30 now also contains vaporized solvent from the precursor solution 12.

The combined stream 30 enters the inlet end of a one-inch inside-diameter, round glass/quartz/ceramic tube 34 which is enclosed in an electrical resistance heated tubular reactor or furnace 36. The furnace 36 is controlled to heat the glass/quartz/ceramic tube 34 and the combined stream 30 to about 550° C. The residence time of the flowing combined stream 30 in the tube 34 is suitable for the heat to cause substantially complete degradation of the oleate ligand material in the combined stream 30 and to allow for the structural evolution of 3-D networks of metal nanocrystals within the aerosol droplets. Combined stream 30 now contains polydisperse mesoporous spherical metal or metal alloy particles (with some residual carbon) 42, degradation products from the ligand material and solvents, as well as the nitrogen atomization gas. Combined stream 30 exits the glass/quartz/ceramic tube 34 through passage 38 and is directed through a filter 40. The filter 40 is heated and maintained, for example, at about 80° C. It collects the spherical metal particles 42 while permitting the exhaust stream 46 of nitrogen and ligand degradation products through outlet passage 44.

The now-fabricated, spherical metal particles are post-heated, for example at about 550° C. for 30 minutes in a nitrogen atmosphere, to remove or carbonize any remaining organic substances.

It is believed that the structural evolution of the spherical particles results from the formation of metal nanocrystals within the aerosol droplets and their fusion into 3-D networks within the heated zone. And, in order to complete the formation process, a suitable residence time (space-time) $\tau$ of the aerosol droplets in the heated zone is about 3 to 10 seconds, and, preferably, at least nine seconds.

Without intending to be limited by a proposed understanding of particle formation, it is further believed that the formation of the metal spherical particles involves the following sequential steps. First, aerosol droplets are formed containing the precursor solution, which are then carried by a nitrogen stream into the heated tube furnace where the solvent starts to evaporate. Metal nanocrystals begin to form in the aerosol droplets from the metal ions or atoms and are stabilized by the oleate ligands, which act as capping agents. The metal nanocrystals continue to form into clusters of nanocrystals, and much of the organic material is expelled from the aerosol droplets, but some carbon may remain. Finally, the aerosol droplets are primarily filled with metal nanocrystals that are organized into a spongy 3-D network skeleton. The metal nanocrystals are uniformly attached by fine carbon particles.

However understood, this aerosol process and suitable variations permit the atomization and aerosol formation of the metal oleate precursor material and its processing into spherical metal-carbon or metal alloy-carbon composite particles.

EXAMPLES

Mesoporous spherical particles are formed from a solution comprising a precursor of one or more metal oleate coordination complexes. In general, the metal oleate precursors are formed by complexing one or more metal-containing compounds with oleic acid. In preferred embodiments, the precursor is prepared by reacting metal oxides, acetates or acetylacetonates with oleic acid under heating by evaporation of water, acetic acid, or acetylacetone. In further embodiments, the metal oleate precursor is prepared by complexing metal salts, such as metal chlorides or metal nitrates, with oleic acid under basic condition in solution. Precursors prepared according to the following illustrative examples have a relatively low ionization degree, and lead to the formation of spherical particles that do not have a densely porous exterior shell.

The prepared metal oleates are dispersed in a liquid medium of, for example a solvent of tetrahydrofuran (THF), before they are atomized into aerosol droplets using a commercial atomizer. The preferred concentration of the metal oleate dispersion depends upon the solubility of the metal oleate in the solvent. For example, when nickel (II)

oleate or platinum (IV) oleate is dispersed in a solvent of THF, a suitable molar concentration of the solution is about 0.01 to about 0.5 moles of nickel or platinum oleate per liter of THF.

THF is a very useful solvent for dispersing the metal oleate precursors because it is liquid at ambient temperatures, readily forms aerosols of the complexes and easily vaporizes during thermal degradation of the complexes. THF displays moderate polarity.

The following experimental examples of these practices are illustrated with respect to the preparation of nickel and platinum containing precursors. But the practices are not limited to these metals. They are generally applicable to any elemental metals from which it is desired to produce mesoporous spherical carbon-metal particles.

Example 1

Nickel (II) oleate is prepared by mixing 2.48 g of nickel acetate and 5.64 g of oleic acid with stirring for about one hour. The mixture is heated to about 150° C. to evaporate the acetic acid and form a transparent liquid of nickel (II) oleate. Nickel (II) oleate can also be prepared by mixing 2.57 g of nickel acetylacetonate and 5.64 g of oleic acid with stirring. The mixture is then heated to evaporate the acetylacetonate and form a transparent liquid of nickel (II) oleate.

In this example, 1 g of the prepared nickel (II) oleate precursor is added to 100 mL of THF. However, up to about 20 g of the prepared nickel oleate precursor can be added to 100 mL of THF to form the precursor dispersion.

The nickel oleate-THF precursor dispersion is then atomized into aerosol droplets using a commercial atomizer (Model 3076, TSI, Inc.) with nitrogen as a carrier/atomization gas. The aerosol droplets are passed through a tubular reactor that is heated to about 550° C. where the aerosol droplets are converted to spherical particles. The spherical particles are subsequently collected by a filter.

The tubular reactor is preferably operated at a volumetric flow rate of about 2.6 L/min (STP). The geometry of the tubular reactor within the heating zone is about 1" (ID)×30" (L). The as-synthesized particles are then post heated at about 550° C. under nitrogen gas for about 30 minutes.

FIG. 2A is a transmission electron microscope (TEM) image of spherical nickel particles that were formed using the nickel (II) oleate precursor as prepared above in this example. The TEM image reveals the nanocrystalline network structure of the spherical nickel particles.

Particles synthesized by this process can be characterized using XRD (Panalytical X'Pert Pro X-ray diffractometer, Cu Kα), TEM (FEI, CM-120, accelerating voltage 120 kV), STEM and chemical mapping (FEI Titan, FEG TEM/STEM System, accelerating voltage 300 kV), and SEM (JEOL JSM-6700F). Electron tomography can be performed with a FEI Tecnai F20 operated at 200 kV. To construct a tomogram of the as-synthesized spherical particles, several particles are deposited onto a grid and are tilted and imaged in a range from −70° to +70°. The tilt series are then aligned and used to reconstruct a three-dimensional representation of each particle. The reconstructions can be further segmented to illustrate the relationship between nickel and carbon throughout the particles. XPS spectra can be collected with a PHI 3057 spectrometer using Mg Kα X-rays at 1286.6 eV and Al Kα radiations at 1486.6 eV. Nitrogen adsorption experiments are performed at 77 K and low pressure.

The chemical composition of the spherical particles is determined using energy-dispersive spectroscopy (EDS). The results suggest that the particles contain about 80, 18, and 2 wt-% nickel, carbon, and oxygen, respectively. STEM-EDS mapping analysis of a single particle reveals that the particles contain a homogeneous distribution of nickel and carbon throughout the particle. Electron tomography is performed to obtain a 3-D reconstruction of the spherical particles and their internal nanocrystalline structure. It is found that the metal nanocrystals are primarily organized into a spongy 3-D network skeleton, and are uniformly attached with fine carbon grains. Total volume reconstruction reveals that the metal nanocrystals develop into 3-D networks, which is in harmony with the results obtained by TEM, STEM, and STEM-EDS. Consistent with the discovery of the 3-D network structure, nitrogen sorption shows a typical type IV isotherm.

The mesoporous spherical particles have a high surface area of about 211 $m^2/g$. The pore size distribution of the particles is calculated by the Barrett-Joynes-Halenda (BJH) method from the desorption branch, and shows a uniform diameter centered at about 3.5 nm. It is worthy to note that the surface area of the particles attributed to the micropores is calculated to be around 26 $m^2/g$, which suggests that the majority of the particle surface area can be attributed to the structure of the mesopores. Due to the presence of carbon, the particles retain more than 200 $m^2/g$ of surface area even after sintering at 550° C. for 6.5 hours, which is of particular importance for catalytic applications.

Example 2

The synthesis strategy of Example 1 may be further extended to make spherical composite particles of metal alloys and carbon. For example, binary spherical particles of a $Ni_xPt_{(1-x)}$ alloy can be made from nickel (II) oleate and platinum (IV) oleate precursors. And TEM and STEM analysis confirm that these metal alloy composite particles exhibit a similar nanocrystalline structure to that of the nickel particles synthesized in Example 1.

In this example, nickel (II) oleate is prepared by dissolving 1.30 g of $NiCl_2$ in 100 mL of methanol, and then adding 5.5 mL oleic acid. 50 mL of a 0.4 molar NaOH methanol solution is dropped into the $NiCl_2$-methanol solution under magnetic stirring conditions for about one hour to precipitate nickel (II) oleate from the solution. The green precipitate of Ni (II) oleate is extracted with hexane, and the solvents are then removed under vacuum overnight.

Platinum (IV) oleate is prepared by dissolving 2 g of platinum hydrochloride ($H_2PtCl_6.6H_2O$) in hexane, and adding 11 mL oleic acid under magnetic stirring conditions at high temperature for about four hours. The solvent is then removed under vacuum overnight.

In the following example, a dispersion of the nickel oleate and platinum oleate precursors is prepared by dissolving the precursors in THF. To make $Ni_{19}Pt_1$ alloy, 11.837 g of nickel (II) oleate and 1.323 g of platinum (IV) oleate are dissolved in 100 mL of THF at room temperature to form a homogenous solution.

As before, the metal oleate precursor dispersion is atomized into aerosol droplets using a commercial atomizer with nitrogen as a carrier/atomization gas. The aerosol droplets are passed through a tubular reactor that is heated to about 550° C., where the aerosol droplets are converted to spherical particles. The spherical particles are subsequently collected by a filter.

FIG. 2B is a transmission electron microscope (TEM) images of spherical $Ni_{0.5}Pt_{0.5}$ alloyed particles, which reveals the nanocrystalline network structure of the particles.

Chemical mapping of the $Ni_xPt_{(1-x)}$ alloy particles suggests that the particles contain a homogeneous distribution of Ni and Pt within the spheres. XRD of the $Ni_xPt_{(1-x)}$ alloy particles reveals that they exhibit a FCC structure, as the peaks shift to the lower 2θ with increasing Pt content. This result indicates that Pt replaces Ni in the formation of these alloys. Moreover, the unit cell parameters of the alloy agree well Vegard's law, $a=a_{Ni}x+a_{Pt}(1-x)$, where $a_{Ni}$ and $a_{Pt}$ is the lattice parameter of Ni or Pt, respectively, and x is the molar fraction of Ni. This further confirms that the composition of the alloy particles can effectively be controlled. Ternary $Ni_xPt_yPd_{(1-x-y)}$ alloy particles can also be successfully synthesized by this method.

Example 3

In a further embodiment, the open mesopores of the as-synthesized spherical particles are filled with another material, for example a material that is capable of storing and releasing hydrogen. In this example, the mesopores of spherical Ni—C particles are infiltrated with a solution of dibutylmagnesium $(Mg(Bu)_2)$ as a precursor for introducing $MgH_2$ into the mesopores of the particles.

In this example 0.5 g of the as-synthesized spherical Ni particles are loaded in a Schlenk tube in a glovebox, which is evacuated to 500 mTorr. After evacuation, 10 ml of a 1 M $Mg(Bu)_2$ heptane solution is injected into the Schlenk tube to immerse the Ni particles for about 24 hours. Then, the Ni particles—now containing $Mg(Bu)_2$—are obtained using a centrifuge and are dried in glovebox. Finally, the $Mg(Bu)_2$ is converted to $MgH_2$ by heating the particles to about 200° C. under a hydrogen pressure of 50 bar. Thus, the mesopores of the spherical Ni—C particles now contain very small particles of $MgH_2$.

Example 4

The hydrogen storage capacity of the as-synthesized spherical Ni particles can be evaluated using a Micromeritics ASAP 2020 at 298 K. Excess hydrogen sorption measurements may be performed at high pressures using a PCTPro-2000 (Hy-Energy Scientific Instruments) at 77 K and a Gas Reaction Controller (Advanced Materials Corporation), which is attached to a chiller at 243 K, 276 K, 298 K, and 325 K.

Figure 5:
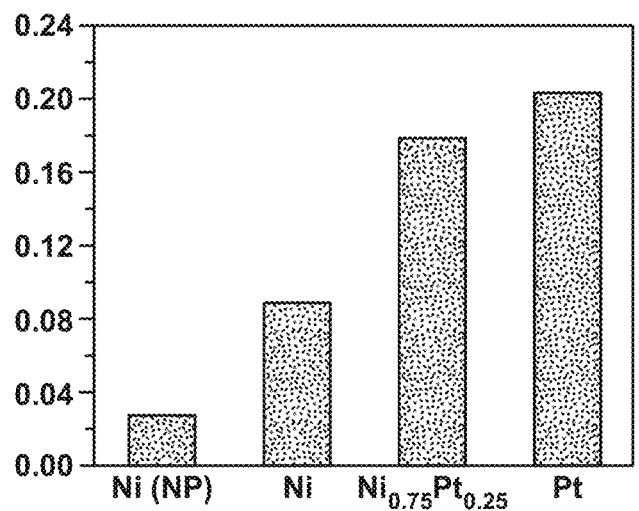
FIG. 5 is a bar chart comparing the percentage, by weight, of $H_2$ adsorbed by four nickel-containing particles at 298 K and 1 bar. The first bar on the chart, labeled Ni (NP), represents the average wt. % $H_2$ adsorbed by commercially-available nickel nanoparticles having average of 30 to 50 nanometers. The remaining bars on the chart represent the wt. % $H_2$ adsorbed by three types of spherical particles synthesized according to preferred embodiments of this invention: Ni, $Ni_{0.75}Pt_{0.25}$ and Pt. The Ni bar represents the average wt. % $H_2$ adsorbed by nickel-carbon composite particles. The $Ni_{0.75}Pt_{0.25}$ bar represents the average wt. % $H_2$ adsorbed by alloyed nickel-platinum and carbon composite particles, the metal nanocrystals comprising approximately 75 mol % nickel and 25 mol % platinum. The Pt bar represents the average wt. % $H_2$ adsorbed by platinum-carbon composite particles.

As shown in FIG. 5, the hydrogen storage capacities of the spherical Ni particles at room temperature is calculated to be less than about one percent, by weight, in spite of the high surface area of the Ni particles.

The hydrogen storage capacity of the spherical Ni particles is believed to be limited by $NiH_{0.5}$ (0.84 wt. % at $3.45\times10^3$ bar and 298 K), which is low for practical application. But, the hydrogen storage capacity of the spherical metal particles can be increased by controlling the composition of the particles. For example, as shown in FIG. 5, spherical $Ni_{0.75}Pt_{0.25}$ particles exhibit greater hydrogen storage capacity than non-alloyed Ni particles.

Example 5

Figure 4A:
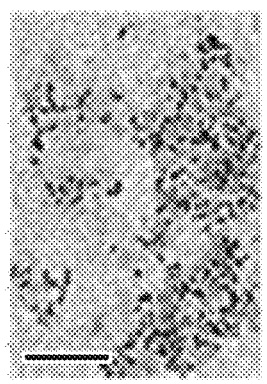
FIG. 4A-4E are transmission electron microscope (TEM) images of aerosol droplets taken at different spaces times ($\tau$), or residence times, within the tubular reactor.
Figure 4B:
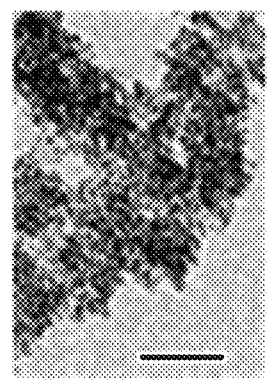
Figure 4C:
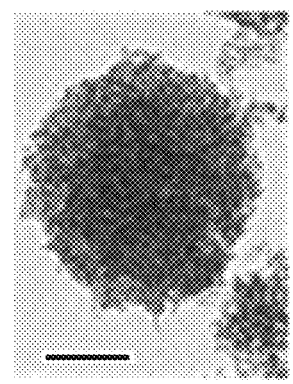
Figure 4D:
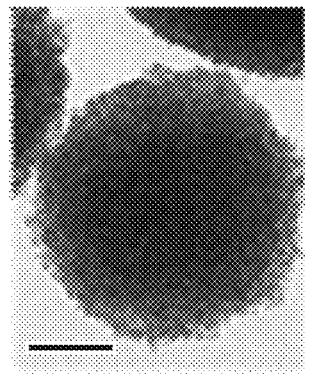
Figure 4E:
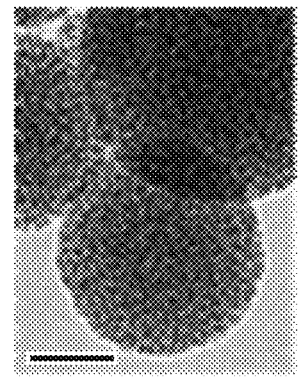

To understand sequential steps in the formation of the spherical particles, a glass tube, with the same dimension as that of the reactor, is wrapped with heating types to create a series length of the heated zone (equivalent to a series of τ, or space time). Particles produced from these reactors are investigated by TEM, revealing the structural evolution of the particles during this rapid continuous process. As shown in FIGS. 4A-4E, TEM images of the particles collected at τ equal to 0.6, 1.2, 1.8, 2.4 and 9.0 seconds, respectively, reveal the sequential steps involved in the spherical particle formation. First, dispersed metal nanocrystals of nickel are formed at about τ=0.6 seconds (FIG. 4A). The metal nanocrystals are fused into nanocrystal clusters at about τ=1.2 seconds (FIG. 4B), and 3-D networks of the metal nanocrystals appear at about τ=1.8 to 2.4 seconds (FIGS. 4C-4D). Further sintering and decomposition of the organic ligands leads to the formation of spherical nickel particles at about τ=9.0 seconds (FIG. 4E). The formation of metal nanocrystals can be attributed to the thermolysis of the metal oleate precursors and from the reducing atmosphere produced by the decomposition of the organic ligands and the solvent molecules. Gas chromographical studies confirm the proposed mechanism, and the formation of CO, —CHO containing molecules and other reducing species in the gaseous stream.

The specific embodiments of practices of the invention that have been described are only for the purpose of illustration and not to be construed as limiting the scope of the invention.

The invention claimed is:

1. A method of making spherical particles that are a composite of one or more elemental metals, elemental carbon, and oxygen, the method comprising:
   forming a metal oleate precursor by reacting one or more inorganic metal salts of the one or more elemental metals with oleic acid in a basic solution;
   precipitating the metal oleate precursor from the solution;
   separating the metal oleate precursor precipitate from any by-products;
   forming a dispersion of the metal oleate precursor in a solvent of tetrahydrofuran;
   forming aerosol droplets of the dispersed precursor in a stream of an inert gas; and
   heating the aerosol droplets in the stream to evaporate the solvent, decompose organic material, and form spherical particles of the one or more elemental metals, elemental carbon, and oxygen having a uniform mesoporous nanocrystalline structure.

2. The method of making spherical particles as recited in claim 1 further comprising:
   heating the aerosol droplets in the stream for a sufficient amount of time so that nanocrystals of the one or more elemental metals form in the droplets, the decomposed organic material is expelled from the droplets, and the metal nanocrystals become organized into a three-dimensional network in which the nanocrystals are uniformly attached by fine elemental carbon particles.

3. The method of making spherical particles as recited in claim 1 wherein the one or more inorganic metal salts are of a metal chloride or a metal nitrate.

4. The method of making spherical particles as recited in claim 1 wherein the one or more elemental metals are at least one of nickel and platinum.

5. The method of making spherical particles as recited in claim 1 wherein the aerosol droplets are heated to a temperature of about 550° C.

6. The method of making spherical particles as recited in claim 1 wherein the aerosol droplets are heated to a temperature of about 550° C. in a reducing atmosphere.

7. The method of making spherical particles as recited in claim 1 further comprising:
   immersing the spherical particles in a solution of dibutylmagnesium;
   removing the particles from the solution; and heating and pressurizing the particles in an atmosphere of hydrogen gas to form magnesium hydride particles in mesopores of the spherical particles.

8. The method of making spherical particles as recited in claim 1 in which the composition of the metal oleate precursor is selected such that the pores of the formed spherical particles are sized for absorption and release of hydrogen.

9. The method of making spherical particles that are a composite of one or more elemental metals, elemental carbon, and oxygen as recited in claim 1 in which a metal halide is dissolved in methanol, oleic acid is added to the methanol solution of the metal halide, and sodium hydroxide is added to the methanol solution-oleic acid mixture to precipitate the metal oleate precursor from the solution.

10. The method of making spherical particles that are a composite of one or more elemental metals, elemental carbon, and oxygen as recited in claim 9 in which the metal halide is a halide of at least one of nickel and platinum.

11. A method of making spherical particles that are a composite of one or more elemental metals, elemental carbon, and oxygen, the method comprising:

forming a metal oleate precursor by reacting one or more inorganic metal salts of the one or more elemental metals with oleic acid in a methanol solution;

precipitating the metal oleate precursor from the methanol solution by the addition of a base;

separating the metal oleate precursor precipitate from any by-products;

forming a dispersion of the metal oleate precursor in a solvent of tetrahydrofuran;

forming aerosol droplets of the dispersed precursor in a stream of an inert gas; and heating the aerosol droplets in the stream to evaporate the solvent, decompose organic material, and form spherical particles of the one or more elemental metals, elemental carbon, and oxygen having a uniform mesoporous nanocrystalline structure.

12. A method of making spherical particles that are a composite of one or more elemental metals, elemental carbon, and oxygen as recited in claim 11 in which the elemental metal is one of nickel and platinum.

* * * * *